United States Patent

Joseph et al.

[11] Patent Number: 5,940,148
[45] Date of Patent: Aug. 17, 1999

[54] METHOD AND APPARATUS FOR RECEIVING AND RECORDING DIGITAL PACKET DATA

[75] Inventors: Kuriacose Joseph, Gaithersburg; Steven E. Lochner, Germantown, both of Md.

[73] Assignee: Hughes Electronics Corporation, El Segundo, Calif.

[21] Appl. No.: 09/190,639

[22] Filed: Nov. 12, 1998

Related U.S. Application Data

[62] Division of application No. 08/855,071, May 13, 1997, Pat. No. 5,844,636.

[51] Int. Cl.[6] .................. H04N 5/76; H04N 7/24
[52] U.S. Cl. .......... 348/845; 348/423; 348/584; 386/83; 386/95; 386/124
[58] Field of Search .................. 348/845, 423, 348/584, 589, 468; 386/83, 95, 124; H04N 7/24, 5/76

[56] References Cited

U.S. PATENT DOCUMENTS

| | | | |
|---|---|---|---|
| 4,747,160 | 5/1988 | Bossard | 455/422 |
| 5,434,678 | 7/1995 | Abecassis | 386/52 |
| 5,477,263 | 12/1995 | O'Callaghan | 348/13 |
| 5,502,504 | 3/1996 | Marshall | 348/584 |
| 5,517,254 | 5/1996 | Monta | 386/83 |
| 5,619,337 | 4/1997 | Naimpally | 386/124 |

*Primary Examiner*—Howard Britton
*Attorney, Agent, or Firm*—John T. Whelan; Michael W. Sales

[57] ABSTRACT

A digital data transmission interface and method are disclosed for providing a stream of digital data packets to a digital recording device. The interface receives a plurality of digital data packets, develops an encapsulated received data packet, which includes a received digital data packet together with a corresponding timestamp, and couples the encapsulated received data packet to a digital recording device. Generated data packets may also be encapsulated and coupled to the recording device together with the encapsulated received data packets.

30 Claims, 6 Drawing Sheets

METHOD AND APPARATUS FOR RECEIVING AND RECORDING DIGITAL PACKET DATA

STATEMENT OF RELATED APPLICATION

This application is a Divisional of a U.S. Pat. application bearing Ser. No. 08/855,071, filed on May 13, 1997, and entitled "Method and Apparatus for Receiving and Recording Digital Packet Data," now U.S. Pat. No. 5,844,636. The disclosure of application Ser. No. 08/855,071 is incorporated herein by reference, in its entirety.

BACKGROUND OF THE INVENTION (a) Field of the Invention

The present invention relates generally to receiving and recording digital packet data. More particularly, it relates to a method and apparatus for receiving broadcast entertainment-type data, such as the packetized digital video, audio, and information data signals transmitted in a direct broadcast satellite (DBS) or digital video broadcast (DVB) system, and for effectively recording the received data on a device such as a digital VHS (DVHS) unit. The recording process may include the insertion of locally generated or locally derived data into the recorded data stream.

(b) Description of Related Art

Conventional communications systems include a receiver for receiving and processing transmitted waveforms. One type of receiver is part of a "wireless digital television" system known commercially by the tradename DSS®. The DSS system, which is utilized by the DIRECTV® broadcast service, allows consumers to receive directly in their homes over 175 television channels broadcast from a pair of powerful satellites. The receiver includes a small 18-inch satellite dish connected by a cable to an integrated receiver/decoder unit (IRD). The satellite dish is aimed toward the satellites, and the IRD is connected to the user's television in a similar fashion to a conventional cable-TV decoder.

On the transmission side, video, audio, and related information data signals are digitally encoded into a packetized data stream using a number of algorithms, including convolutional error correction. The encoded data stream is then punctured to reduce bandwidth requirements, modulated to Ku-band frequency, transmitted to the satellite, and relayed from the satellite to the 18-inch satellite dish. The satellite dish shifts the Ku-band signal down to an L-band signal which is transmitted through the cable to the IRD.

In the IRD, front-end circuitry receives the L-band signal and converts it to the original digital data stream of video, audio, and related information signals. The digital data stream is fed to video/audio decoder circuits which perform the main video/audio processing functions such as demultiplexing and decompression. A micro-controller controls the overall operation of the IRD, including the selection of parameters, the set-up and control of components, channel selection, viewer access to different programming packages, blocking certain channels, and many other functions. The compression and decompression of packetized video and audio signals may be accomplished according to the Motion Picture Expert Group (MPEG) standard for performing digital video/audio compression. Thus, the IRD unit typically includes an MPEG-1 or MPEG-2 video/audio decoder in order to decompress the received compressed video/audio.

In general, digital video and audio signals can be transported, processed, and recorded with a high degree of quality. In order to take better advantage of the high quality associated with digital video/audio, digitally-based peripheral devices, such as digital video cassette recorders (DVCR's) and digital video disks (DVD's), have been developed to receive and process video/audio in a digital format. The present invention relates to a method and apparatus for receiving broadcast entertainment-type data, such as packetized digital video, audio, data, and control signals received in a direct broadcast satellite (DBS) system, and for effectively recording the received data on a device such as a digital VHS (DVHS) unit.

SUMMARY OF THE INVENTION

The present invention is embodied in a wireless distribution system that securely, reliably, and inexpensively distributes digital packetized video, audio, and data to individual users at geographically remote locations. The wireless distribution system is preferably implemented using the uplink and airlink facilities of a digital satellite television distribution system such as the DSS® system utilized by the DIRECTV® broadcast service. The present invention relates generally to a method and apparatus for receiving broadcast entertainment-type data, such as packetized digital video, audio, and related information data received in a direct broadcast satellite (DBS) system, and for effectively recording the received data on a device such as a digital VHS (DVHS) unit. The recording process may include the insertion of locally generated or locally derived data into the recorded data stream.

At a satellite uplink facility, video and audio signals may be digitized in known manners, multiplexed with other data signals, compressed (if required), mated with error correction codes, modulated on a carrier, and uplinked to a geosynchronous satellite. The satellite receives the uplinked signals and rebroadcasts them over a footprint that preferably covers at least the continental United States. Receiver units, which are typically located at the user's dwelling, receive the satellite signals. The receiver units include an antenna, which preferably is in the form of a satellite dish, along with an integrated receiver/decoder (IRD). The antenna feeds the received satellite signal to the IRD unit which recovers the originally transmitted digital video, audio, and data.

Typically, the received packets are presented to a transport circuit that is in communication with a microprocessor. The microprocessor informs the transport circuit about which packets are of interest. For example, if the IRD is instructed by the user to display the ESPN station, the microprocessor instructs the transport to receive and process all packets (including particularly the video and audio packets) associated with the ESPN programming. The information about how to receive ESPN, or any other programming channel, is provided via the program guide data stream. In general, the program guide identifies (based on header information) those packets that must be assembled in order to construct the audio and video for any of the available programs. Program guide data also includes information needed to construct a graphical listing of the showtimes and channels for available programming, program description data, program rating data, program category data, and other data. The transport identifies desired ESPN packets by header information in the packet, strips off the payload portion of the packet, and forwards the payloads to an audio/video decoder (or optionally first to an intermediate storage location). The decoder then stores the payloads in designated memory locations. The ESPN video and audio payloads are then called up from their memory locations as needed, decoded, converted to NTSC analog signals, and provided to a conventional television monitor for display.

Although digital-based peripheral devices have been developed, such as digital VHS recorders (DVHS) and digital video disk (DVD) devices, there has not been developed a device and method for effectively and efficiently interfacing such peripherals with existing digital based broadcast systems such as DSS®. The present invention provides a method and apparatus for receiving broadcast entertainment-type data, such as packetized digital video, audio, data, and control signals received in a direct broadcast satellite (DBS) system, and for effectively and efficiently recording such received data on a device such as a digital VHS (DVHS) unit. The recording process may include the insertion of locally generated or locally derived data into the recorded data stream.

According to one aspect of the present invention, circuitry is provided in a conventional DSS® IRD for identifying received data packets that are to be recorded by a peripheral, and for placing the data packets in a format suitable for recording and playback. For example, the IRD may be programmed to assemble, for recording, data packets that are currently of interest, and discard or ignore the data packets that are not currently of interest. The data format for recorded data packets according to the present invention incorporates a time stamp that represents the actual spacing between the recorded packets as they were received over the air in the complete data stream. By recording packets according to the same inter-packet spacing that was received over the air, the system's synchronization information and timing are maintained and do not have to be regenerated during the playback process.

In another aspect of the invention, the above-described circuitry further includes the capability of inserting locally generated or locally derived data packets into the inter-packet spacings built into the recorded video and audio packets. The inserted data packets could include a variety of data that performs a variety of functions. For example, customized program guide data related only to the recorded program could be inserted. These inserted packets, would be available during playback in the same fashion that program guide data is available during broadcast viewing.

The invention itself, together with further objects and attendant advantages, will best be understood by reference to the following detailed description, taken in conjunction with the accompanying drawings.

DESCRIPTION OF THE PREFERRED EMBODIMENTS

In general, television signal distribution systems generally rely on either a cable network or on free-space propagation for delivering television signals to individual users or subscribers. Cable-based television systems transmit one or more individual television signals or "channels" over wire, while free-space propagation systems transmit one or more channels over-the-air, i.e., in a wireless manner. Most large-scale cable and wireless television signal distribution systems broadcast a broadband television signal having a plurality of individual television signals or channels modulated onto one or more carrier frequencies within a discernable frequency band.

Some wireless television signal distribution systems use one or more geosynchronous satellites to broadcast a broadband television signal to receiver units within a large geographic area, while other wireless systems are land-based, using one or more transmitters located within smaller geographic areas to broadcast to individual receiver units within those geographic areas. An example of a land-based "cellular" type television signal distribution system is disclosed in Bossard, U.S. Pat. No. 4,747,160. This system includes multiple television signal transmitting stations, each of which transmits a television signal to individual receivers spread throughout a limited geographic region, and is configured so that adjacent transmitting stations use modulation and frequency diversity to prevent interference.

Some cellular systems, such as those commonly referred to as LMDS (local multi-point distribution system) and MMDS (multi-channel, multi-point distribution system), use a land-based cellular-type transmitting setup to rebroadcast satellite signals at frequencies different than the frequencies used by the satellite. Each of the transmitters of an LMDS system typically transmits within a one to five mile radius cell while each of the transmitters of an MMDS system typically transmits within an approximately 30-mile radius cell.

The present invention is embodied in a satellite-based distribution system. The system generally includes an earth station that compiles a number of programs (video and audio) into a broadband signal, modulates a carrier frequency band with the broadband signal and then transmits (uplinks) the modulated signal to a geosynchronous satellite. The satellite amplifies the received signal, shifts the signal to a different carrier frequency band and transmits (downlinks) the frequency shifted signal to earth for reception at individual receiver stations.

The uplink and downlink broadband signals of the disclosed satellite distribution system may be divided into a plurality of transponder signals, each having a plurality of individual channels. For example, analog satellite systems operating in the so-called "C-band," i.e., between about 3.7 GHz and about 4.2 GHz, typically broadcast ten, 500 MHz wide, transponder signals, each including twelve, 40 MHz wide, analog channels. Satellite systems may also broadcast a set of transponder signals at multiple polarizations, for example, a right-hand circular polarization (RHCP) and a left-hand circular polarization (LHCP), within the band of carrier frequencies associated with the satellite; effectively doubling the number of channels broadcast by the system.

Satellite-based signal distribution systems exist for many frequency bands, including the so-called "Ku-band" which ranges from approximately 12 GHz to approximately 18 GHz. The preferred embodiment of the present invention utilizes substantially the same signal architecture and format as the DSS® system utilized by the DIRECTV® broadcast service, which uses an uplink signal having 12 RHCP transponder signals and 12 LHCP transponder signals modulated into the frequency band between about 17.2 GHz and about 17.7 GHz. Each of these 24 transponder signals includes data packets related to approximately 32 individual television channels associated therewith. The satellites associated with the DSS® system shift the uplink transponder signals to carrier frequencies ranging from approximately 11.7 GHz to approximately 12.2 GHz and transmit these frequency-shifted transponder signals back to earth for reception at each of a plurality of individual receiver stations.

According to the present invention, each station includes an antenna coupled to an IRD unit, interface circuitry coupled to the IRD, and a digital peripheral unit coupled to the interface circuitry. The antenna typically comprises a parabolic dish antenna, and is pointed in the general direction of the transmitting satellite (or other transmitting location) to thereby receive the broadband movie signal. Typically, such antennas include a low noise block (LNB) which filters and shifts the incoming signal to an intermediate frequency band, such as L-band, which is between approximately 1.0 GHz and approximately 2.0 GHz. The DSS® system, in particular, shifts the signal received from the satellite to the frequency band between approximately 950 MHz and approximately 1450 MHz.

Typically, only the RHCP transponder signals or the LHCP transponder signals are mixed down to L-band, depending on which channel a user is viewing. However, in systems having a two-channel LNB, both the RHCP and the LHCP transponder signals are shifted down to L-band and provided, via separate lines, to the receiver unit.

According to the present invention, the video/audio packets associated with a particular television program are stripped from the L-band carrier by the IRD unit and provided to the interface circuitry for routing to the digital peripheral device. The peripheral device may be a digital recording unit such as a digital video cassette recorder (DVHS) or digital video disk (DVD).

According to one aspect of the present invention, the interface circuitry and the IRD identify received data packets that are to be recorded by the peripheral, and place the data packets in a format suitable for recording and playback. For example, the IRD may be programmed to assemble, for recording, data packets that are currently of interest, and discard or ignore the data packets that are not currently of interest. The data format for recorded data packets according to the present invention incorporates a time stamp that represents the actual spacing between the recorded packets as they were received over the air in the complete data stream. By recording packets according to the same inter-packet spacing that was received over the air, the system's synchronization information and timing are maintained and do not have to be regenerated during the playback process.

In another aspect of the invention, the above-described IRD and interface circuitry further include the capability of inserting locally generated or locally derived data packets into the inter-packet spacings built into the recorded video and audio packets. The inserted data packets could include a variety of data that perform a variety of functions. For example, customized program guide data related only to the recorded program could be inserted. These inserted packets, would be available during playback in the same fashion that program guide data is available during broadcast viewing.

Figure 1:
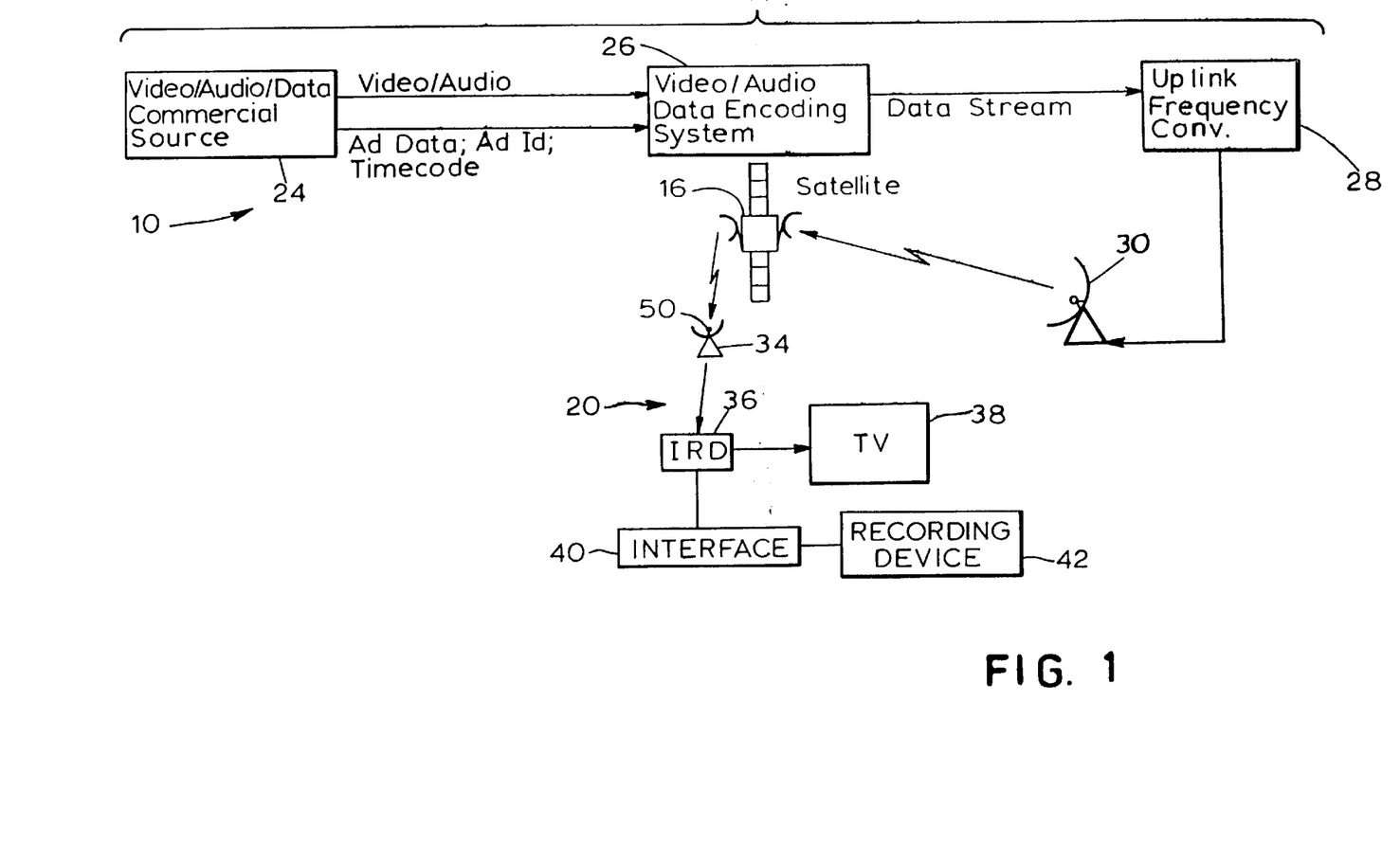
FIG. 1 is a diagram of a direct broadcast satellite system that implements the method and apparatus of the present invention.

FIG. 1 is a block diagram of a transmission and reception system 10 embodying features of the present invention. The illustrated system 10 includes a transmission station 14, a relay 16, and a plurality of receiver stations, one of which is shown at reference numeral 20. A wireless airlink provides the communications medium between the transmission station 14, the relay 16, and the receiver station 20. The transmission station 14 includes a programming/data source 24, a video/audio/data encoding system 26, an uplink frequency converter 28, and an uplink satellite antenna 30. The relay 16 is preferably at least one geosynchronous satellite. The receiver station 20 includes a satellite reception antenna/dish 34, a low-noise-block (LNB) 50 connected to the dish 34, a receiver unit (or IRD) 36 connected to the LNB 50, a conventional television monitor 38 connected to the receiver unit 36, an interface 40 coupled with the receiver unit 36, and a digital peripheral recording device 42 connected to the interface 40. It should be noted that while the interface 40 appears in FIG. 1 separately from the IRD 36, the functionality of the interface 40 described herein could alternatively be integrated into the IRD 36, which would then be provided with an input/output connection for coupling the digital peripheral recording device 42 to the interface 40 within the IRD 36.

In operation, the transmission station 14 can receive video and audio programming from a number of sources, including satellites, terrestrial fiber optics, cable, or tape. Preferably, the received programming signals, along with data signals such as electronic scheduling data and conditional access data, are sent to the video/audio/data encoding system 26 where they are digitally encoded and multiplexed into a packetized data stream using a number of conventional algorithms, including convolutional error correction and compression. In a conventional manner, the encoded data stream is modulated and sent through the uplink frequency converter 28 which converts the modulated encoded data stream to a frequency band suitable for reception by the satellite 16. Preferably, the satellite frequency is Ku-band. The modulated, encoded data stream is then routed from the uplink frequency converter 28 to an uplink satellite antenna/dish 30 where it is broadcast toward the satellite 16 over the airlink. The satellite 16 receives the modulated, encoded Ku band data stream and re-broadcasts it downward toward an area on earth that includes the various receiver stations 20. The satellite dish 34 of the receiver station 20 shifts the Ku-band signal down to an L-band signal which is transmitted via the LNB 50 to the receiver unit 36.

Front-end circuitry (shown in FIG. 4) inside the receiver unit 36 receives the L-band RF signals from the LNB 50 and converts them back into the original digital data stream. Decoding circuitry (shown in detail in FIG. 4), receives the original data stream and perform video/audio processing operations such as demultiplexing and decompression. A microprocessor or CPU 58 (also shown in FIG. 4) controls the overall operation of the receiver unit 36, including the selection of parameters, the set-up and control of components, channel selection, the theater's access to different movie packages, and many other functions.

Figure 2:
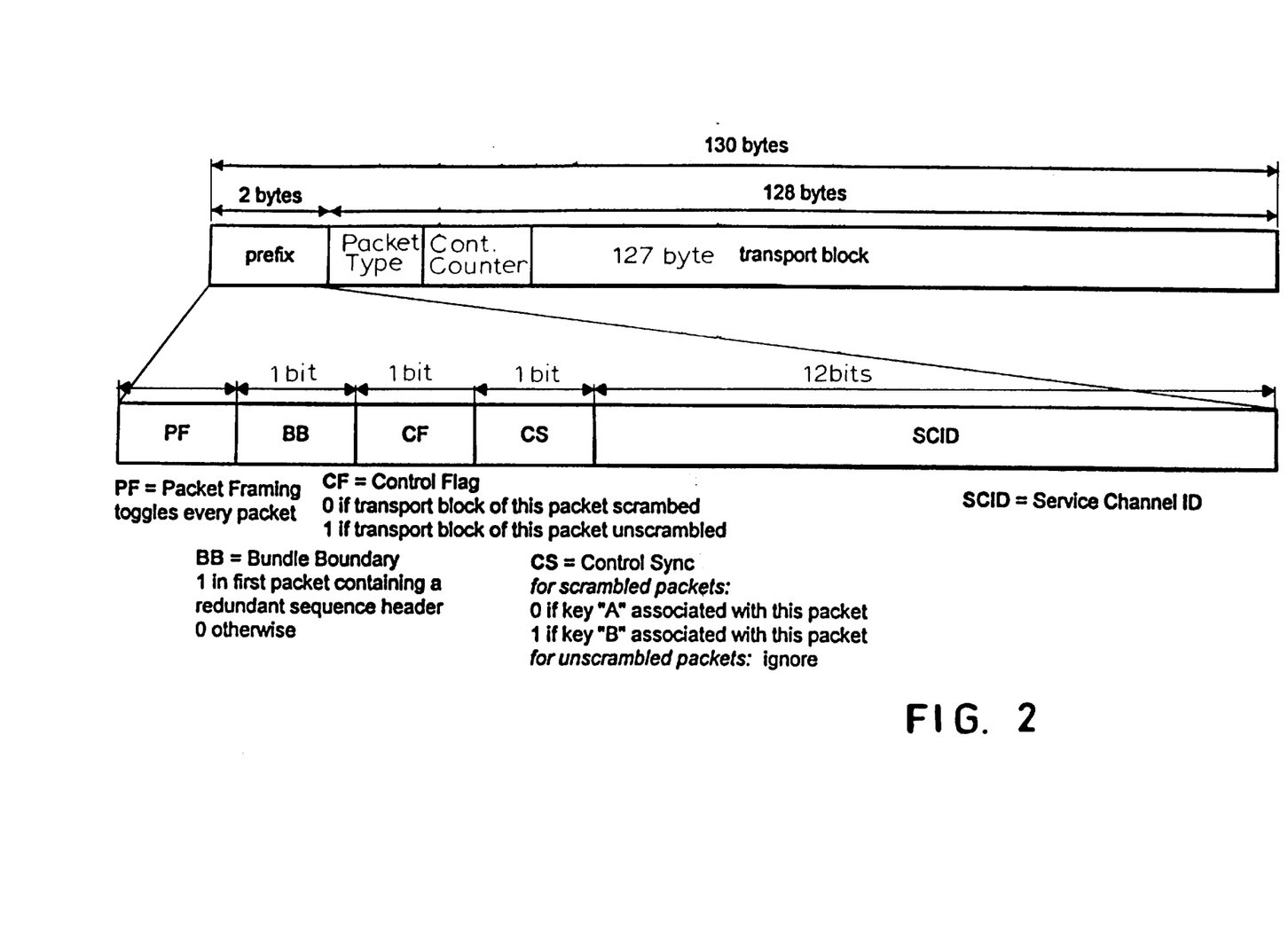
FIG. 2 is a diagram illustrating a preferred data format for packetized data received and transmitted by the direct broadcast satellite system of FIG. 1.
Figure 4:
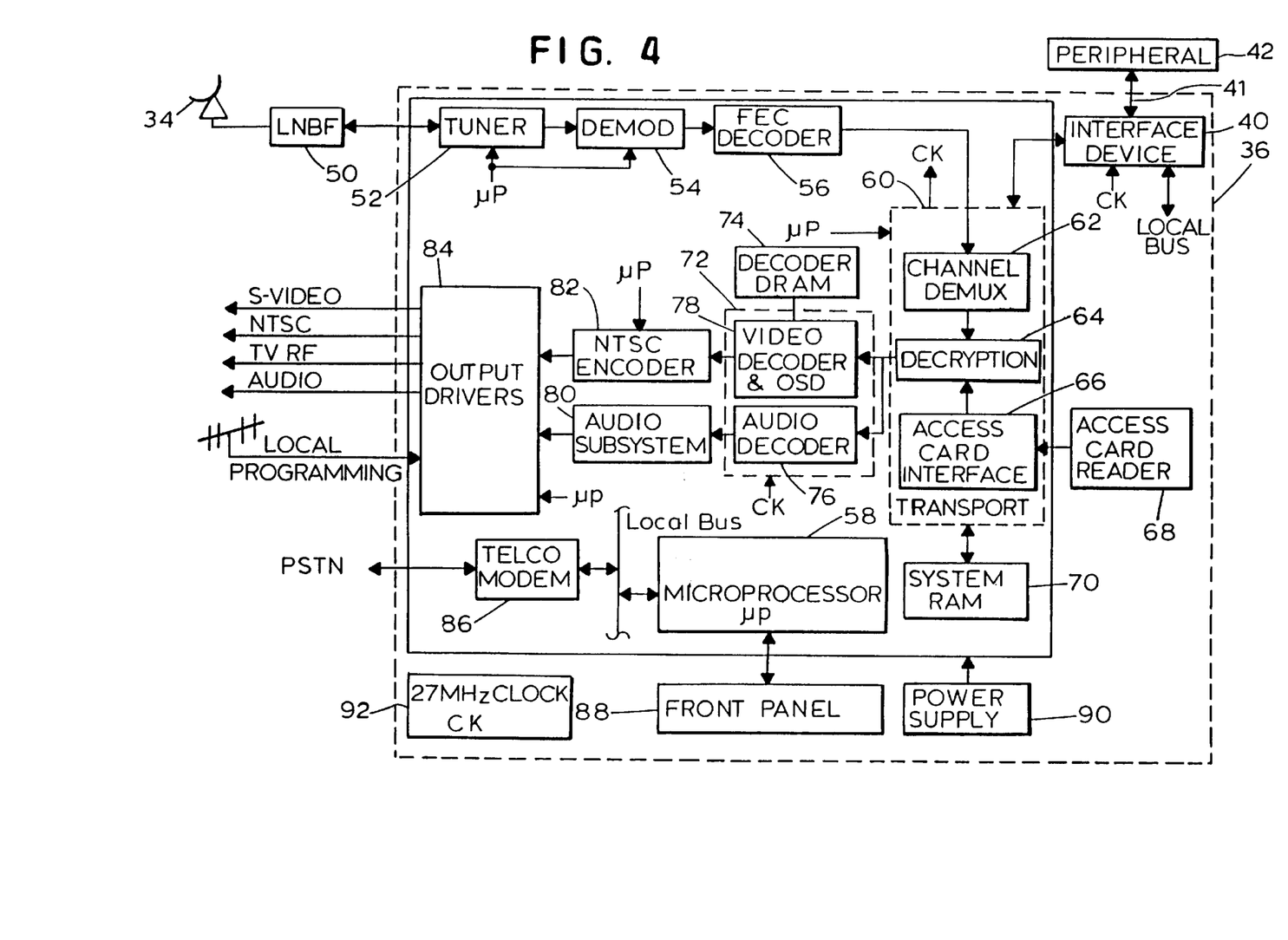
FIG. 4 is a block diagram illustrating more details of a receiver station embodying the present invention.

FIG. 2 is a diagram illustrating a typical data packet that is transmitted via the system shown in FIGS. 1 and 4. The preferred data packet shown in FIG. 2 is in the format and of the type used in a DSS® digital broadcast system. All information is transmitted in this format, including video, audio, program guide, conditional access, and other data. As shown, each data packet is 130 bytes long, but seventeen additional bytes (not shown) are used for error correction and/or other functions. The first two bytes (a byte is made up of 8 bits) of information contain the SCID and flags. The SCID (service channel ID) is a unique 12-bit number that uniquely identifies the particular data stream to which a data packet belongs. The flags are made up of four bits used primarily to control whether or not the packet is encrypted and which key to use. The third byte of information is made up of a four-bit packet type indicator and a four-bit continuity counter. The packet type identifies the packet as having one of four formats. When combined with the SCID, the packet type determines how the packet is to be used. The continuity counter increments once for each packet type and SCID. The next 127 bytes of information consists of the "payload" data, which is the actual usable information sent from the program provider.

FIG. 4 is a more detailed block diagram of a portion of the receiver unit 36 shown in FIG. 1. The satellite dish antenna 34 transfers the received satellite signal to a conventional LNB circuit 50 which then passes the signal to the receiver unit 36. The receiver unit 36 includes a tuner 52, demodulator 54, FEC decoder 56, a micro-controller 58, a transport circuit 60, a channel demultiplexer 62, decryption circuit 64, an access card interface 66, an access card reader 68, a system RAM 70, an audio/video decoder circuit 72 having a random-access-memory (RAM) 74, audio decoder 76, video decoder 78, an audio digital-to-analog circuit 80, an NTSC encoder 82, output drivers 84, a modem connection 86, a front panel user interface 88, and a power supply 90, coupled together as illustrated. A 27 MHz clock signal generator 92 is also provided. The clock generator 92 generates a clock signal (CK) which is coupled to the audio/video decoder circuit 72 and which is frequency-calibrated by a signal received from the transport circuit 60, as shown.

The transport 60 receives the transport stream of digitized data packets containing video, audio, scheduling information, and other data. The digital packet information contains identifying headers as part of its overhead data. Under control of the micro-controller 58, the channel demultiplexer 62 filters out packets that are not currently of interest, and routes the data packets that are of interest through the decryption circuit 64 and, in the case of some packets, also through the access control circuits 66, 68 to their proper downstream destination. The decryption circuit 64 provides decryption for the data packets that have been encrypted. The access control circuits 66, 68 provide access control by any conventional means. For example, access control may be achieved by requiring a data packet to have a proper authorization code in order to be passed to the decryptor 64 and/or video decoder 78. The access card reader 68 can interface with an access card (not shown) that will receive the packet authorization code, determine its validity, and generate a code that confirms to the transport 60 that the subject data packet is authorized.

The authorized data of interest, which now consists of the payload portions of the received data packets, are forwarded to decoder DRAM 74 for buffering and may optionally be intermediately stored in system RAM 70. The audio/video decoder 72 decodes the payloads stored in DRAM 74, as needed. The requested data is routed from the RAM 70 through the transport 60 to the audio/video decoder 72. At that time, the data is routed to the video decoder 78 (which includes on-screen display circuitry) and the NTSC encoder 64. The video decoder 78 reads in the compressed video data from the DRAM 74, parses it, creates quantized frequency domain coefficients, then performs an inverse quantization, inverse discrete cosine transform (DCT) and motion compensation. At this point, an image has been reconstructed in the spatial domain. This image is then stored in a frame buffer in the DRAM 74. At a later time, the image is read out of the frame buffer in DRAM 74 and passed through the on-screen display circuitry to the NTSC encoder 82. The on-screen display circuitry (located in the video decoder 78) generates the graphics that allow text such as the electronic program guide data to be displayed. The NTSC encoder 78 converts the digital video signals to analog according to the NTSC standard, thereby allowing video to be received by a conventional television 38 (FIG. 1) or video cassette recorder (not shown).

According to the present invention, the receiver unit 36, via controls initiated by the CPU 58, can route received digital packets for recording by the peripheral 42 connected to the receiver unit 36. The CPU 58 targets certain received digital packets for recording. The packets are identified in a conventional manner by their SCID header information. Packets having SCID values that are not targeted for recording are not selected by the transport 60 for recording. The CPU 58 instructs the transport 60 to decrypt encrypted packets, then forward the 130-byte packets to an interface circuit 40 that feeds the packets to a digital video/audio/data output port 41 in communication with the peripheral 42.

Figures 3, 5:
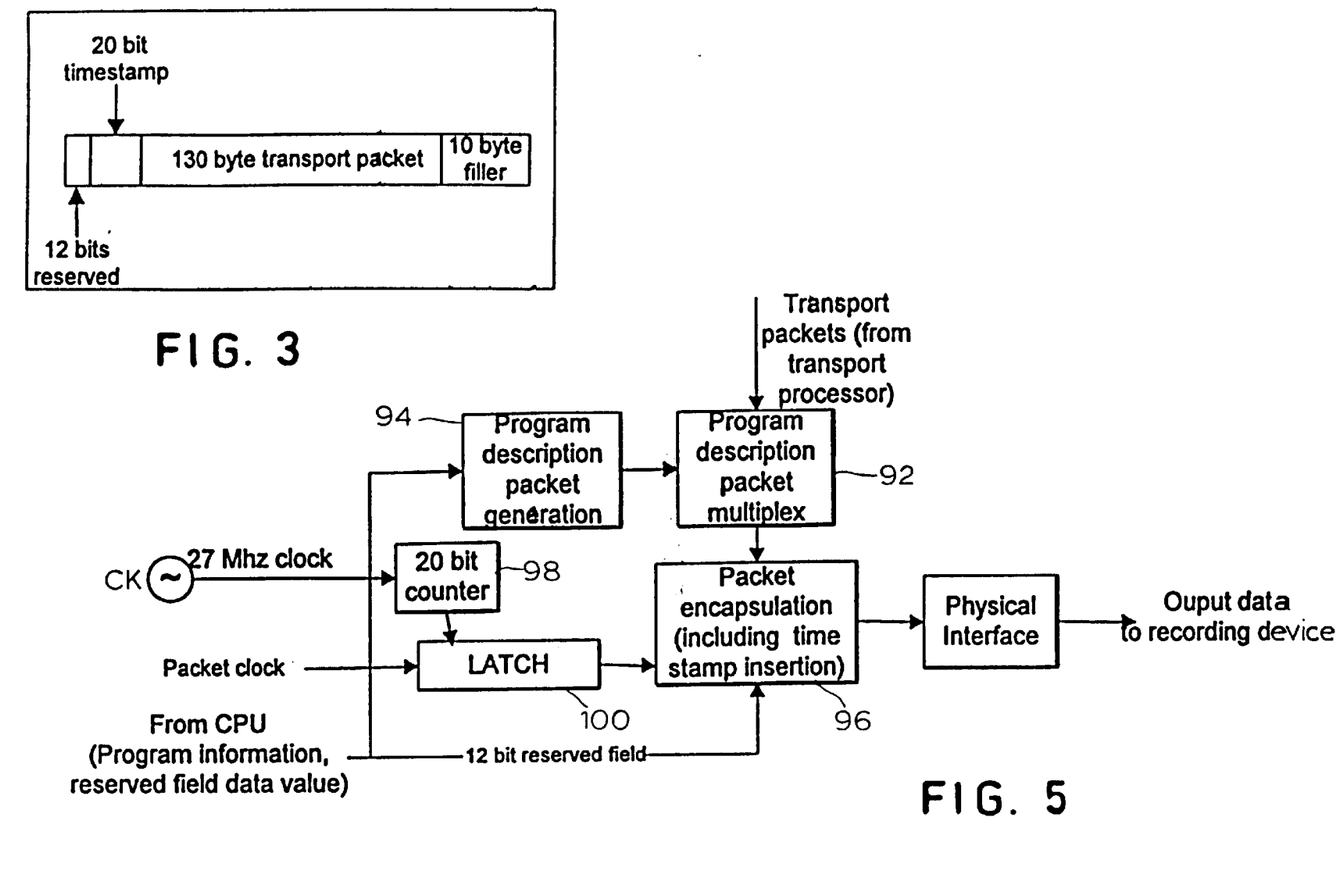
FIG. 3 is a diagram illustrating a preferred data format for packetized data recorded at the receiver stations of the direct broadcast satellite system of FIG. 1.
FIG. 5 is a block illustrating more details of selected portions of the receiver station shown in FIGS. 1 and 4.

In the interface circuit 40, packets are placed in a format suitable for recording. This format is illustrated in FIG. 3. The interface 40 adds a four-byte header to the packet, along with a ten-byte trailer of zero-value bits. The added header includes 12 reserved bits and a 20-bit time stamp. The time stamp reflects the temporal spacing between packets as they were received over the air. Because not all of the packets received over the air are recorded, time gaps exist between packets of data sent to the peripheral 42 for recording. The interface 40 maintains system synchronization information of the received data stream by incorporating into the recorded data a time stamp that represents the spacing of the recorded packets as they were received over the air. More particularly, the difference between the timestamps incorporated into two consecutively recorded packets corresponds to the number of clock cycles that elapsed after the first of those packets was received over the air until the second one was received.

In addition to maintaining packet spacing and generating the recorded data format of FIG. 3, the interface 40, transport 60, and CPU 58 also utilize the spacing between recorded packets as a place at which to insert additional digital packets into the stream of recorded data. The inserted data could be locally generated, or could be information derived from received data. Each inserted data packet must obey the rules of the conventional DSS® bitstream and therefore must have the format shown in FIG. 2. The header identification, or SCID value(s), of the inserted data packets should be different from the SCID values of data being sent to the peripheral 42 for recording. For example, program guide data received over the air is typically assigned SCID number 1. However, because the received program guide includes far more information than is relevant to the recorded program, the received program guide data having SCID number 1 could be replaced with a locally generated or locally derived program description bitstream and which could be recorded as inserted data having SCID number 1. Another bitstream that could be eliminated from the recording process is the conditional access packet (CAP) stream, which in the typical DSS® system is assigned SCID number 2. A custom bitstream having SCID number 2 could therefore be inserted in the recorded data packet stream to provide, for example, intro graphics during the playback operation. Such functionality would differentiate receiver units incorporating the present invention from other receiver units available from other manufacturers, which is commercially desirable. For example, all recorded programming could be given a graphical introduction such as a logo and tradename of the receiver unit manufacturer.

Figure 6:
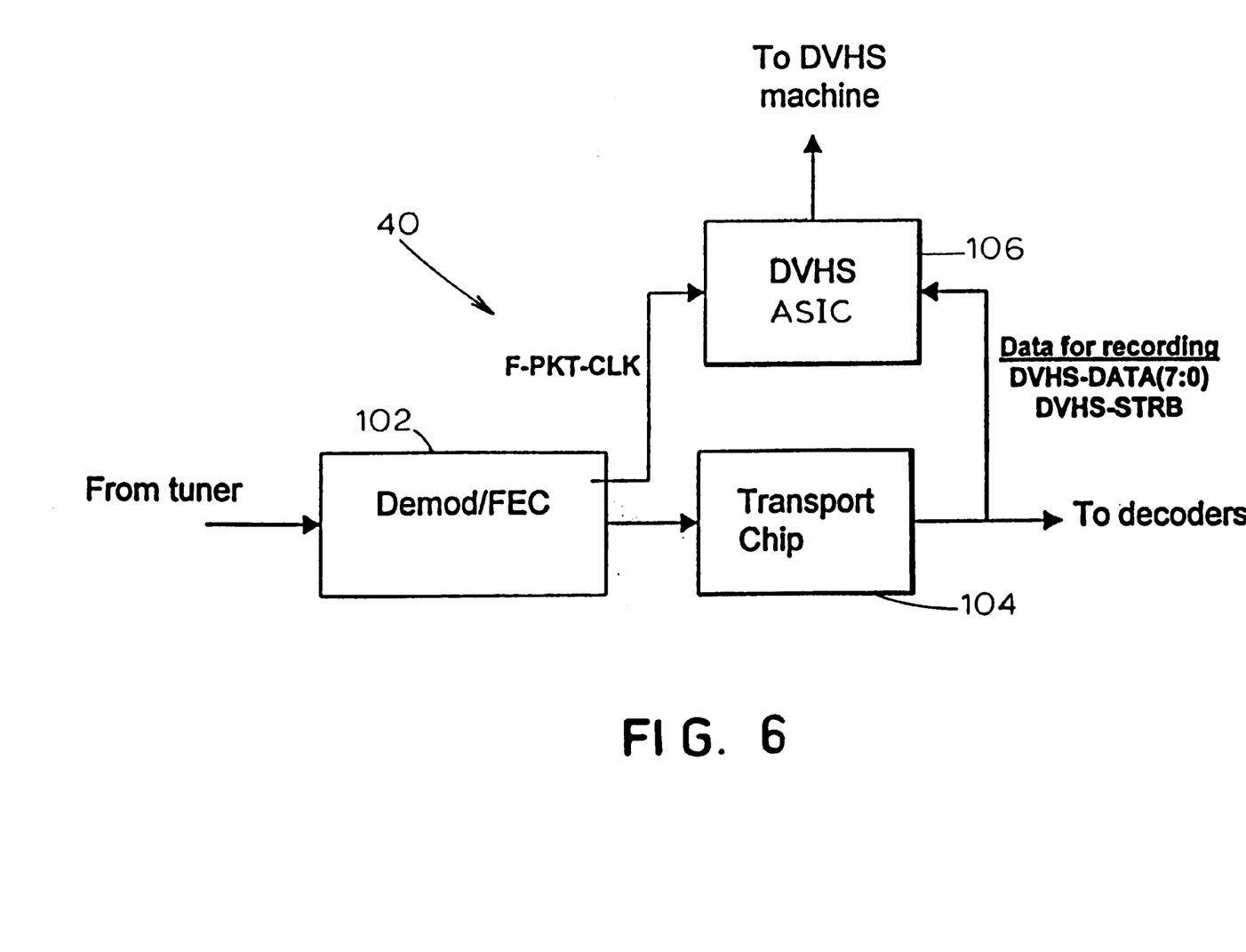
FIG. 6 is a block diagram illustrating still more details of selected portions of the receiver station shown in FIGS. 1, 4, and 5.

FIGS. 5 and 6 illustrate more details about the interface 40 shown in FIG. 4. As shown, the interface 40 includes a multiplexer 92, a program description packet generation circuit 94, a packet encapsulation circuit 96, a 20-bit counter 98 and a latch 100. The multiplexer 92 receives over the air packets, along with packets to be inserted into the recorded data stream. The 27 Mhz receiver clock is used by the 20-bit counter 98 to generate the time stamp that represents the proper packet spacing. The latch 100 receives the output of the 20-bit counter 98, along with packet clock information, and provides the time stamp value to the packet encapsulation circuit 96.

The packets to be inserted by the receiver unit 36 into the recorded bitstream are generated by the CPU 58 that controls the decoding system. The CPU 58 loads into the interface 40 the entire 130 byte packet to be inserted into the recorded bitstream. The CPU 58 then informs the interface 40 when the loading is complete. The interface 40 transmits the packet to the peripheral 42 when it gets an opportunity, which is when there is a gap in the recorded bitstream. The interface 40 then lets the CPU 58 know when the inserted packet has been transmitted to the peripheral 42. The CPU 58 is then free to load the next packet for insertion into the recorded bitstream.

In general, when the inserted packets are a program guide bitstream, the packets will have to be loaded by the CPU 58 on the interface 40 in the order of desired transmission. In the alternative, the interface 40 could be provided with direct access to the receiver unit's memory. In that case, the processor 58 could load the entire sequence of packets defining the entire program description directly into the receiver's memory, and the interface 40 could sequentially access the packets directly from the receiver memory.

Figure 7:
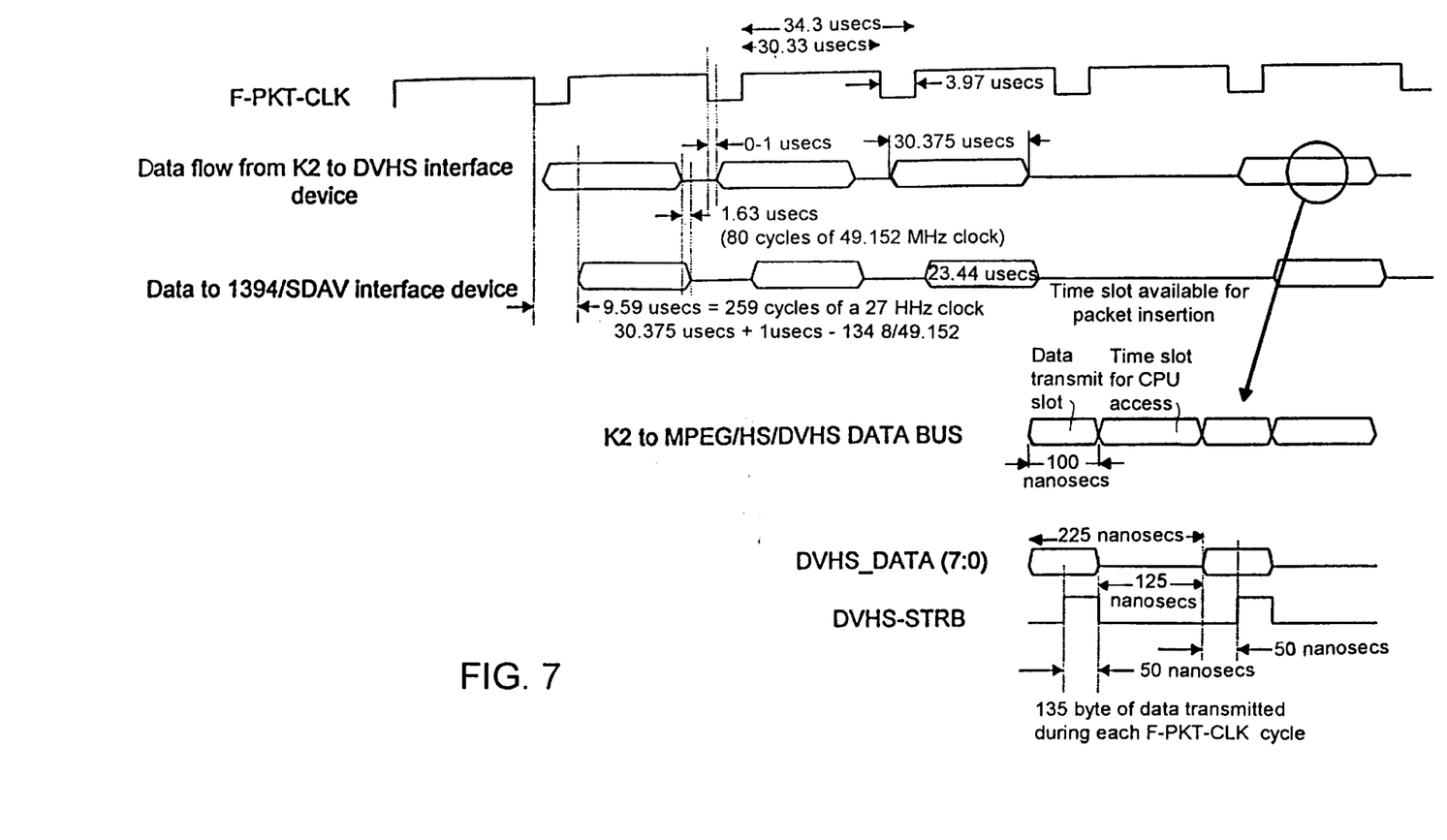
FIG. 7 is a timing diagram illustrating the packet insertion and recording process carried out by the circuitry shown in FIG. 6.

An important aspect of the above-described invention, and particularly of the packet-insertion features, is the requirement that when transport packets received over the air are sent to the peripheral 42 (e.g., for recording), the temporal inter-packet spacing of those packets as received over the air must be preserved. Only in that way can the recorded-over-the-air data maintain the system synchronization necessary to recreate the data stream that was received over the air. FIG. 6 illustrates circuitry (preferably representing at least part of the interface circuit 40) that detects gaps in the over the air packet stream that is sent to the peripheral 42 for recording. FIG. 7 is a timing diagram that illustrates data flow based on the diagram shown in FIG. 6. The implementation shown in FIGS. 6 and 7 preferably utilizes a simplified digital A/V (SDAV) bus interface connection to the peripheral recording device 42 which operates at 49.152 Mbps.

As shown in FIG. 6, the demodulator and FEC circuits are incorporated into a single demod/FEC integrated circuit (IC) 102, the transport circuit 60 is provided on a single transport IC 104, and the interface circuit 40 is provided on a single digital packet interface ASIC 106. Referring to both FIGS. 6 and 7, the F-PKT-CLK signal is generated for every packet sent from the front-end demod/FEC 102 to the transport 104. Because the bitstream received over the air is continuous, the F-PKT-CLK is periodic. By the time of the negative edge of an F-PKT-CLK cycle, if the packet had no errors, a complete packet is assembled in the transport 104 and is ready for transmission to the subsystems that require the packet contents. If a packet is to be recorded, the DVHS-STRB signal will be active for the entire 130 byte packet duration, and the interface device picks up the entire contents of the packet for processing and forwarding to the recording device. The interface 40 begins transmission of a packet for processing and forwarding to the peripheral recording device 42 a fixed number of 27 MHz clock cycles after the negative going edge of F-PKT-CLK. The time at which transmission from the interface 40 to the peripheral recording device 42 begins is after the instant of time at which the packet data begins to arrive at the interface 40 from the receiver unit's CPU 58. Therefore, the interface 40 can determine if a packet of data from the transport 104 will have to be transmitted in a particular packet cycle even before the actual transmit cycle begins. This can be accomplished by checking for any strobes a fixed time after the falling edge of the F-PKT-CLK. If data is not being received from the transport 104 during the particular packet clock cycle, the interface 40 uses the opportunity to insert the packet created by the processor (if such a packet exists) into the recorded bitstream. Using this approach, the interface device can take advantage of the temporal gaps in the recorded bitstream to insert additional packets for recording, without adversely affecting the recording of packet data that is received over the air or the synchronized timing thereof.

The interface 40 also receives packets from the peripheral 42 and provides them to the receiver unit 36 for playback. Selected packets received from the peripheral 42 during playback are forwarded to the CPU 58 of the receiver unit 36 and are processed just like packets received over the air. Specifically, the CPU 58 is programmed in a conventional manner to instruct the channel demultiplexer 62 of the transport 60 to filter the SCID's that contain the inserted packets. The data in the packets making up the filtered SCID's (i.e., the inserted packets) are forwarded to memory and post-processed by the CPU 58 in order to enable the appropriate decoding functions.

The above-described packet recording and insertion technique is also applicable even if the packet formatting shown in FIG. 3 is not used for the recording system. Also, interface speeds other than 49.152 Mbps could be used to connect the peripheral recording device.

Of course, it should be understood that a range of changes and modifications can be made to the preferred embodiment described above. For example, the present invention is described in connection with a particular hardware and processing structure for transmitting and receiving digital video/audio and related data. However, a wide variety of transmitting and receiving structures could be utilized as long as the essential movie distribution features described herein are present. For example, the receive antennae could be larger than 18 inches to improve link margin and limit any fade outs during bad weather. Moreover, the data streams to be recorded in accordance with the present invention could be derived from any other desired transmission medium in place of satellite broadcast. Some exemplary transmission media include cable or terrestrial broadcast, LMDS, MMDS, or other similar formats. It is therefore intended that the foregoing detailed description be regarded as illustrative rather than limiting and that it be understood that it is the following claims, including all equivalents, which are intended to define the scope of this invention.

What is claimed is:

1. A method of providing a stream of data packets to a recording device, comprising the steps of:

receiving a locally generated stream of data packets and a transmitted stream of data packets, the transmitted stream of data packets having an original temporal spacing between data packets; and multiplexing the locally generated data packets and the transmitted data packets to form a multiplexed stream of data packets so that the multiplexed stream of data packets preserves the original temporal spacing of the transmitted data packets and so that the locally generated data packets are distributed into a plurality of temporal spaces between the transmitted data packets.

2. The method of claim 1, wherein the recording device has at least digital VHS recording functionality.

3. The method of claim 1, wherein the transmitted stream of data packets comprises audio, video, data, or control signals.

4. The method of claim 1, wherein the transmitted stream of data packets comprises program guide data.

5. The method of claim 1, wherein the locally generated stream of data packets comprises program guide information.

6. The method of claim 1, wherein the transmitted stream of data packets is broadcast over the air.

7. The method of claim 6, wherein the transmitted stream of data packets is transmitted from a satellite.

8. The method of claim 1, further including the step of encapsulating the multiplexed stream of data packets.

9. The method of claim 8, wherein the encapsulating step encapsulates data packets together with a timestamp.

10. The method of claim 9, wherein the timestamp represents the actual temporal spacing between data packets.

11. The method of claim 9, wherein the timestamp has at least twenty bits.

12. The method of claim 1, wherein data packets have a payload portion with at least 127 bytes.

13. The method of claim 8, further including the step of recording the encapsulated stream of multiplexed data packets with the recording device.

14. The method of claim 13, further including the step of playing back recorded data packets.

15. The method of claim 14, wherein the recorded data packets are played back using timestamps to reproduce the original temporal spacing of the as they were originally transmitted.

16. A digital data transmission interface for providing a stream of data packets to a recording device, the interface comprising:

a data packet multiplexer adapted to receive a locally generated stream of data packets and a transmitted stream of data packets, the transmitted stream of data packets having an original temporal spacing between data packets; and the multiplexer further adapted to produce a multiplexed stream of data packets so that the multiplexed stream of data packets preserves the original temporal spacing of the transmitted data packets and so that the locally generated data packets are distributed into a plurality of temporal spaces between the transmitted data packets.

17. The apparatus of claim 16, wherein the recording device has at least digital VHS recording functionality.

18. The apparatus of claim 16, wherein the transmitted stream of data packets comprises audio, video, data, or control signals.

19. The apparatus of claim 16, wherein the transmitted stream of data packets comprises program guide data.

20. The apparatus of claim 16, wherein the locally generated stream of data packets comprises program guide information.

21. The apparatus of claim 16, wherein the transmitted stream of data packets is broadcast over the air.

22. The apparatus of claim 21, wherein the transmitted stream of data packets is transmitted from a satellite.

23. The apparatus of claim 16, further comprising an encapsulating means coupled with the multiplexer for individually encapsulating the multiplexed data packets.

24. The apparatus of claim 23, wherein the encapsulating means encapsulates data packets together with a timestamp.

25. The apparatus of claim 24, wherein the timestamp represents the actual temporal spacing between data packets.

26. The apparatus of claim 25, wherein the timestamp has at least twenty bits.

27. The apparatus of claim 16, wherein data packets have a payload portion with at least 127 bytes.

28. The apparatus of claim 23, further comprising a coupling means for coupling the encapsulated multiplexed data packets to the recording device.

29. The apparatus of claim 28, further adapted to play back recorded data packets.

30. The apparatus of claim 29, wherein the data packets are played back using timestamps to reproduce the original temporal spacing of the data packets as they were originally transmitted.

* * * * *